United States Patent Office 2,721,805
Patented Oct. 25, 1955

2,721,805
LIGHT WEIGHT FLOWABLE CONCRETE COMPOSITION

William T. Burke, Pittsburgh, Pa.

No Drawing. Application March 18, 1952, Serial No. 277,306

1 Claim. (Cl. 106—97)

This invention relates to a light-weight flowable concrete composition that is particularly suitable for use as a floor fill to enclose conduits disposed on the floor and which is also adapted for various other uses.

The object of this invention is to provide a low cement-content concrete body that has great strength, but is of lighter weight and is made from a more readily flowable mixture than various bodies heretofore employed, and wherein there is a firmer bonding of the aggregates with the other ingredients, in that the aggregates employed are quite hard and have sharp edges and are vesicularly surfaced, the bonding material including a relatively small amount of water-cooled granulated blast furnace slag that has a high lime content and is readily friable, and also containing Portland cement.

For many years, crushed cinders had been used for this purpose, but the advent of powdered coal, gas and oil for heating purposes has made cinders too scarce to be used for floor fill. Cinder concrete floor fill does not flow, except by using a great deal of expensive Portland cement. Cinder concrete fill has a poor cement mortar floor finish bonding value, and because the cinders have a high sulphur content, the conduits would corrode if water came in contact with the cinder fill.

To overcome this cinder scarcity, concrete expanded on the job with aluminum powder is now being used. This concrete is expanded 25% of its volume and weighs 120 lbs. per square foot, and it is very difficult to get uniform expansion, as cold and hot weather affects its expansion; furthermore only certain brands of cement co-act uniformly and properly with the aluminum powder or similar expanding agents, and the cement mortar floor finish does not bond properly to this fill when hardened, without a costly job of cleaning the surface of the fill and brushing on a rich cement grout immediately before the laying of the floor finish.

In freezing or very hot weather, this grout fails to perform its function properly and a poor bond is obtained. If this finish does not bond properly to the fill, the finish cracks and comes loose.

I have discovered that I obtain an excellent floor fill if I deposit in a mixer a very small cement content concrete composition made from hard, sharp edged and vesicular surfaced aggregates in combined sizes from coarse to fine or dust and made from expanded slag and crushed expanded clays or shale, pumice or air-cooled blast furnace slag and embed them in a relatively small amount of water-cooled granulated slag that becomes partly crushed during the mixing operation and to which has been added Portland cement and water. This fill composition weighs approximately 100 lbs. per cubic foot and needs only 3 sacks of Portland cement to the cubic yard. Without the water-granulated slag, the composition would be extremely harsh and non-flowable. To make the mixture flowable and to get added cementing material I use the water-cooled granulated slag, because the hard aggregates crush the friable cellular granulated slag to sand and dust. This crushing process releases much free lime which has cementing qualities and is an excellent lubricant which, combined with the cement, gives the sharp edged aggregates the necessary vehicle to make the fill flowable. If additional expensive Portland cement is added to increase flowability, it makes the fill heavier, but reducing dead loads on the supporting costly steel framing is important. So it is cheaper and reduces dead loads to use the low-priced water-granulated slag.

I have also discovered that by adding a relatively small amount of the water-cooled granulated slag to the mix and with a certain plasticity, that upon screeding my floor fill composition, some of the sharp-edged aggregates will be tilted, and, while they project above the screeded surface, they are embedded in the fill, and I have also discovered that this causes voids behind the tilted aggregates. The vesicular surfaces on the projecting aggregates provide excellent anchorage for the cement mortar floor finish that becomes disposed on and around them, and the voids behind the projecting aggregates make good keyways to also bond the floor finish to the fill after it has hardened. This is a very important feature of this type of floor fill, because the perfect mechanical bond between the fill and the floor finish assures a stronger floor which provides a good membrane to help resist wind stresses on the building.

The aggregates are used in a combination of sizes ranging from coarse to fine, and the water-cooled granulated slag used is standard commercial ungraded slag high in lime content and generally wasted by the steel companies. The Portland cement used may be air entrained. Some of the liquid air-entrained cement penetrates into the cells in the granulated slag during the mixing period and helps to make the mix more plastic.

I find that I get the best results when I deposit the aggregates in the mixer first, then I deposit the water-cooled granulated slag on top of the aggregates, then I deposit the cement on top of the slag. When the water is added to the cement, the liquid cement penetrates into the cells of the granulated slag first; then as the composition is mixed the air-cooled slag aggregates are embedded in the cementing and lubricating mix, so that by the time the mix leaves the mixer, an excellent low-cost light-weight floor fill is ready for placement.

I have found that the best results are obtained by using crushed air-cooled blast furnace slag. It is harder than the other above-mentioned aggregates, with sharp edges and vesicular surfaces. When the molten slag is dumped, it is subjected to great internal stresses, and when it cools off, there are further internal stresses in the slag. When the slag finally hardens and is crushed, each piece of slag has numerous uneven pitted or vesicular surfaces, very few of which are flat, the surfaces being generally curved or angular. This makes for an excellent bond between the aggregates and the cementing materials and makes a stronger light-weight concrete. This hard slag being of the same chemical composition as the granulated blast-furnace slag provides a fill having uniform expansion, which is important in case of fire.

The making of a flowable mix from such sharp-edged aggregates is vitally important, because it must be able to flow around the ducts, and any reinforcing rods or wire fabric which may be embedded in the composition. The effect of screeding on this composition is remarkably fortunate, because it makes it possible for the floor fill to act as a light-weight combination structural floor slab and fill, because the cement mortar floor finish has such a perfect bond to the type of surface caused by the screeding action on the composition. This means that this dense high compression floor finish, which is generally applied when the composition has hardened is mechanically bonded to my composition slab, and can be calculated to carry a considerable part of the compression developed in the slab from beam action or bending moment. For example, in some constructions, a 150 lb. per cubic foot structural concrete floor slab is laid. The concrete enclosing the conduits as well as carrying all loads has an ultimate compression value of generally 3000 lbs. per square inch, and as only the upper one-third of the slab is in compression, I can use my mix for the same thickness of slab. The weight of the heavy concrete slab, assuming it is 6 inches thick, is 75 lbs. per square foot and the weight of 5 inches of my composition figuring its compression value at 2000 lbs. per square inch and its weight at 108 lbs. per cubic foot, would be 45 lbs, and one inch cement floor finish would be 12 lbs. per square foot, then the total weight per square foot of my new composition floor slab would be 57 lbs., thereby, making a saving of 18 lbs. per square foot. On a skyscraper, this saving in the dead load of the floor would result in considerable saving of costly steel in the supporting steel framing, and there would be some saving in reinforcing steel embedded in my composition floor.

Preferably, the water-granulated slag used in the mixture will be not more than one-half the weight of the air-hardened slag granules used therein, but advantageous results can be secured by using the water-cooled slag in quantity (by weight) equal to from 5% to 50% of the weight of the aggregates.

One suitable mixture contains

| | Pounds |
|---|---|
| Water-cooled granulated furnace slag (commercial) | 575 |
| Air-cooled furnace slag (commercial) | 1725 |
| Portland cement | 282 |
| And water. | |

The slab and fill being made from the same material (blast furnace slag) saves operational cost on the job, and in case of fire, the same expansion in both slab and fill would guarantee fewer cracks in the composition than would develop in the heavy gravel or stone floor slab. Intimately bonding the slab and fill together would provide a stronger floor and would greatly help in bracing the building. Experience has taught that applying the floor finish immediately to the freshly laid concrete results in the mechanics in many of the other trades, such as the plumber, steam-fitter, plasterer, etc., badly marring the newly laid cement floor finish and costly means usually are provided to protect the floors, but even this protection is frequently ignored and the finish is damaged, so generally the finish is applied on the hardened floor slab or fill when the other mechanics are finished. It is difficult to get a guaranteed bond between a cement mortar floor finish and a hardened slab or fill, and the effect of screeding on my composition is to give an excellent mechanical tie means to bond the finish.

The effects of the screeding of this material and its uses as a floor fill and supporting slab are more fully shown and described in my co-pending patent application Serial No. 277,307 filed March 18, 1952. By water-cooled blast furnace slag I mean the ordinary commercially used product which is cooled in such manner as to be sufficiently friable to break down under relatively light pressures such as those produced when mixing it with hard lumps or granules such as those of air-cooled blast furnace slag. The term "air-cooled blast furnace slag" referred to in the specification and claim is the product that results when molten slag is deposited in pits or banks and permitted to solidify by slowly cooling under atmospheric conditions.

I claim as my invention:

The method of making a light-weight concrete mixture, which comprises introducing into a mixing chamber water-cooled granulated blast-furnace slag of high lime content and aggregates of air-cooled blast furnace slag, the water-cooled slag being not more than one-half of the weight of the air-cooled slag, and mixing Portland cement and water with the slags, the mixing operation being carried to a point at which the water-cooled granulated slag has been reduced to fines by the air-cooled slag and free lime released therefrom.

References Cited in the file of this patent
UNITED STATES PATENTS

| 219,570 | Dimelow | Sept. 16, 1879 |
| 903,062 | Dresler | Nov. 3, 1908 |
| 1,020,124 | Brown et al. | Mar. 12, 1912 |
| 1,226,292 | Willing et al. | May 17, 1917 |
| 1,314,752 | Olsen | Sept. 2, 1919 |
| 1,549,552 | Hunsaker | Aug. 11, 1925 |
| 2,023,511 | Brosius | Dec. 10, 1935 |
| 2,632,711 | Trief | Mar. 24, 1953 |

FOREIGN PATENTS

| 409,530 | Great Britain | May 3, 1934 |

OTHER REFERENCES

Lea, F. M. and Desch, C. H., "The Chemistry of Cement and Concrete," Edward Arnold & Co. (1935), pages 272 and 273.